United States Patent [19]

Matsuno et al.

[11] Patent Number: 5,679,891
[45] Date of Patent: Oct. 21, 1997

[54] FAILURE DIAGNOSTIC APPARATUS FOR SWIRL CONTROL APPARATUS

[75] Inventors: Osamu Matsuno, Ebina; Hiroshi Abe, Yokosuka, both of Japan

[73] Assignee: Nissan Motor Co., Ltd., Kanagawa-ken, Japan

[21] Appl. No.: 666,781

[22] Filed: Jun. 19, 1996

[30] Foreign Application Priority Data

Jun. 19, 1995 [JP] Japan .................. 7-151777

[51] Int. Cl.$^6$ .................. F02B 31/00; F02D 41/02; G01M 15/00
[52] U.S. Cl. .................. 73/118.1; 73/115; 73/117.3; 73/118.2; 340/439
[58] Field of Search .................. 73/115, 116, 117.2, 73/117.3, 118.1, 118.2, 202.5, 204.11; 340/439; 364/431.03

[56] References Cited

U.S. PATENT DOCUMENTS

| | | | |
|---|---|---|---|
| 4,823,753 | 4/1989 | Murakami et al. | 123/417 |
| 4,972,814 | 11/1990 | Matsuki et al. | 123/308 |
| 4,998,518 | 3/1991 | Mitsumoto | 123/306 |
| 5,048,496 | 9/1991 | Misumi et al. | 123/531 |
| 5,323,748 | 6/1994 | Foster et al. | 123/435 |
| 5,537,864 | 7/1996 | Sood | 73/116 |

FOREIGN PATENT DOCUMENTS 2-61326  3/1990  Japan .

*Primary Examiner*—George M. Dombroske
*Attorney, Agent, or Firm*—Lowe, Price, LeBlanc & Becker

[57] ABSTRACT

A region in which Tp<2.0 ms at which a negative pressure can be reliably assured is set is defined as a diagnostic region on the closed side of a solenoid valve. When the solenoid valve is controlled to be closed, and the pressure switch is in an ON state, it is determined that the solenoid valve or the like is abnormal. When the pressure switch is in an OFF state a predetermined time after the solenoid valve is controlled to be opened, it is determined that the pressure switch is abnormal. In a non-rotation state of the engine 1 in which a pressure in a negative-pressure air supply pipe is an atmospheric pressure, when the pressure switch is turned on, it is determined that the pressure switch is normal; and when the pressure switch is turned off, it is determined that the pressure switch is abnormal.

7 Claims, 3 Drawing Sheets

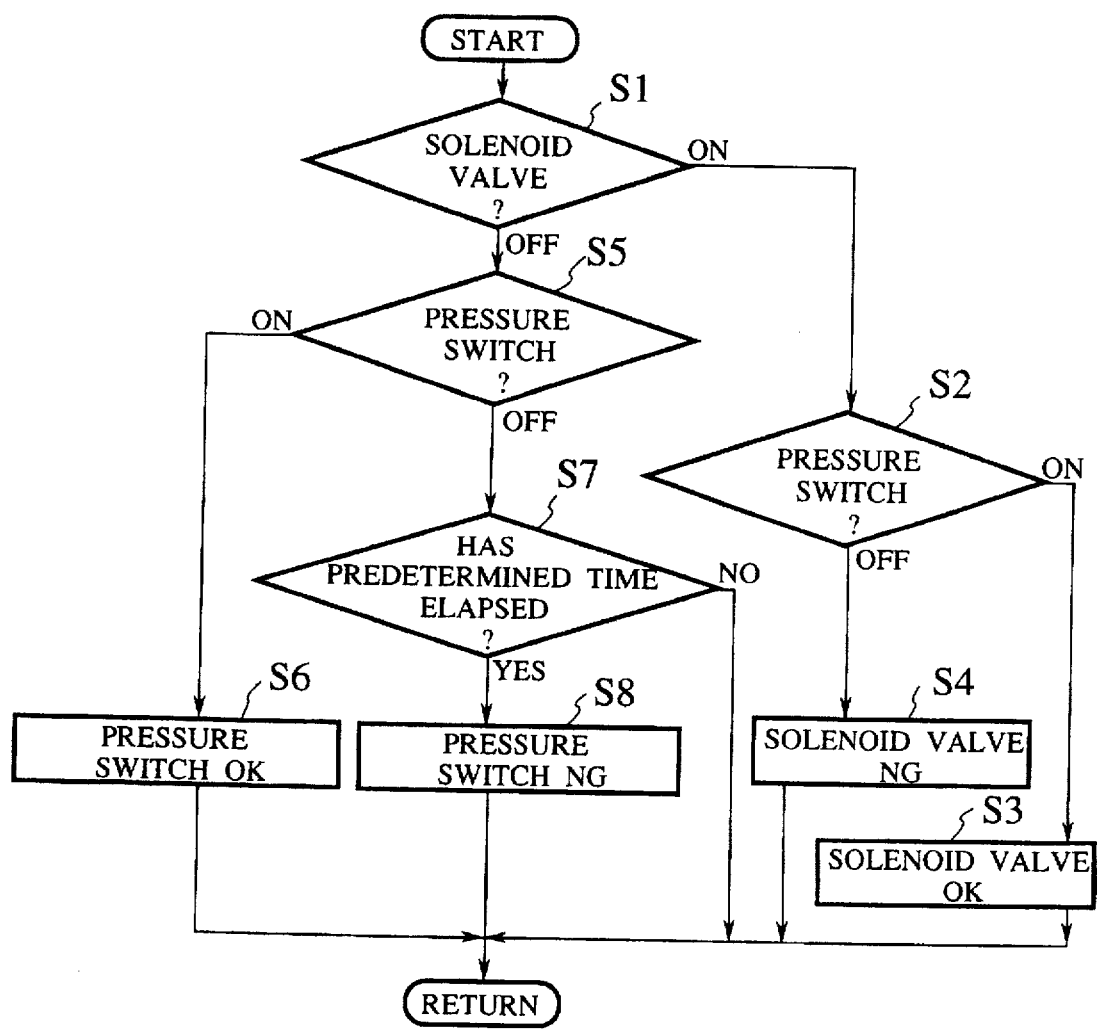

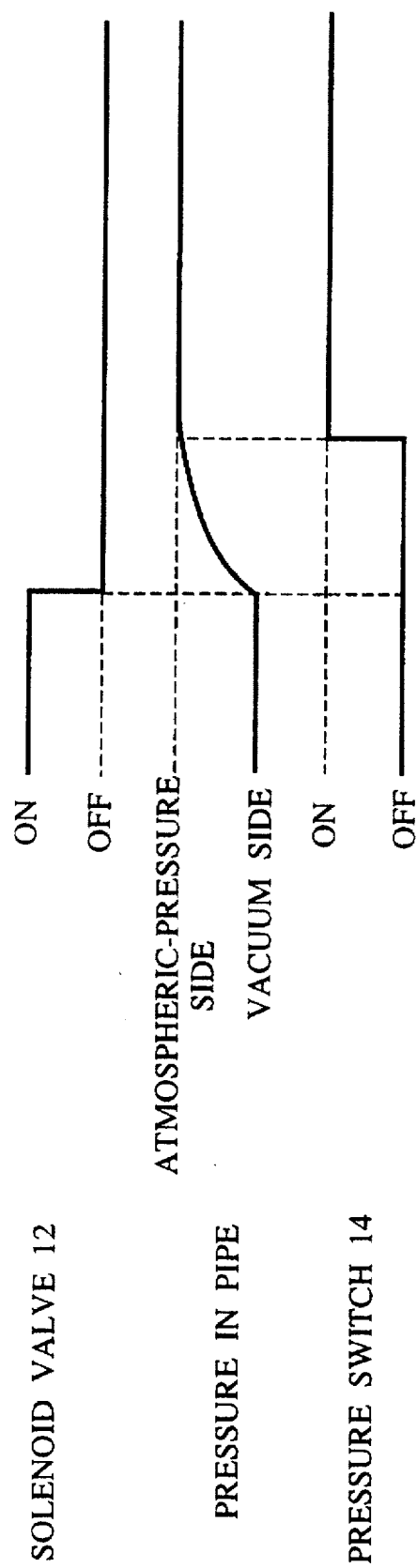

FAILURE DIAGNOSTIC APPARATUS FOR SWIRL CONTROL APPARATUS

BACKGROUND OF THE INVENTION

1. Field of the Invention

The present invention relates to a failure diagnostic apparatus for a swirl control apparatus.

2. Description of the Related Art

In recent years, in order to improve fuel consumption and purify an exhaust gas, in some combustion engine in a low-speed low-load operation region, an air/fuel ratio is controlled such that an actual air/fuel ratio is higher than a theoretical air/fuel ratio.

In this case, in order to obtain stable combustibility even if an air/fuel ratio is made high, some combustion engine has a swirl control valve for swirling suction air which is arranged in an intake valve to increase the mixing ratio between fuel and air (see Japanese Unexamined Patent Publication No.2-61326).

In order to check whether a swirl control valve normally operates, a pressure switch is arranged in a negative-pressure application pipe for applying a negative pressure from an intake valve.

In a conventional failure diagnostic apparatus for a swirl control apparatus does not diagnose the operations of the swirl control valve and the negative pressure switch.

However, if the pressure switch has a failure, the failure diagnosis of the pressure switch cannot be accurately performed. For this reason, the failure of the negative-switch must be diagnosed.

SUMMARY OF THE INVENTION

The present invention has been made in consideration of such a conventional problem, and has as its object to provide a failure diagnostic apparatus for a swirl control apparatus which can diagnose a pressure switch.

Therefore, according to the first aspect of the present invention, there is provided a failure diagnostic apparatus for a swirl control apparatus comprising a swirl control valve, arranged in an intake valve extending to a intake valve of an internal combustion engine, for expanding suction air disturbance in a closed state, a negative-pressure actuator for opening/closing the swirl control valve, a solenoid valve, arranged in a pipe extending to a negative-pressure operation chamber of the negative-pressure actuator, for selectively supplying negative-pressure or atmospheric-pressure air into the pipe by energizing control of the negative-pressure actuator, a pressure switch for detecting a pressure in a pipe between the solenoid valve and the negative-pressure actuator, and diagnostic means for diagnosing an operation state of swirl control on the basis of the energizing control of the solenoid valve and a detection result of the pressure in the pipe obtained by the pressure switch, wherein the diagnostic means is arranged in such a manner that, when a combination between the energizing control of the solenoid valve and the detection result from the pressure switch is abnormal, the diagnostic means determines, depending on the combination, whether the negative switch is normal or abnormal.

According to the second aspect of the present invention, the diagnostic means is arranged in such a manner that the diagnostic means performs diagnosis a predetermined time after the solenoid valve is switched.

According to the third aspect of the present invention, the solenoid valve closes an atmospheric-pressure side valve by energizing the solenoid valve, the pressure switch has a pole such that the pressure switch outputs a signal when the pressure in the pipe is on an atmospheric pressure side with reference to a predetermined pressure, and stops outputting of the signal when the pressure in the pipe is on a negative pressure side.

According to the fourth aspect of the present invention, the diagnostic means is arranged in such a manner that the diagnostic means determines that the pressure switch is normal when a signal is output from the pressure switch when the internal combustion engine is not rotated to generate no negative pressure, and determines that the pressure switch is abnormal when the pressure switch outputs no signal.

According to the fifth aspect of the present invention, the diagnostic means is arranged in such a manner the diagnosis means diagnoses the pressure switch in an OFF state of the solenoid valve.

According to the sixth aspect of the present invention, the diagnostic means is arranged in such a manner that a region in which outputting of a signal from the pressure switch is stopped is defined by an engine load, and close-diagnosis of an atmospheric-pressure valve of the solenoid valve is performed in the region.

In the arrangement according to the first aspect of the present invention, since the diagnostic means determines whether the pressure switch is normal or abnormal depending on the combination between the energizing control of the solenoid valve and the detection result of the pressure in the pipe obtained by the pressure switch, not only an operation state of swirl control but also an operation state of the pressure switch can be diagnosed.

In the arrangement according to the second aspect of the present invention, even if a switching valve is switched, the pressure in the pipe may not be immediately changed. When diagnosis is performed a predetermined time after, the pressure in the pipe is immediately changed. For this reason, reliability of diagnosis is improved.

In the arrangement according to the third aspect of the present invention, since a frequency of occurrence of a failure in which a signal is output from the pressure switch is lower than a frequency of occurrence of a failure in which the pressure in the pipe becomes an atmospheric pressure by inactivation of the solenoid valve or removal of the pipe, abnormality of an operation state of swirl control can be determined. Therefore, system abnormality can be discriminated from abnormality of the negative switch.

According to the arrangement according to the fourth aspect of the present invention, normality/abnormality of the negative switch can be accurately determined.

In the arrangement according to the fifth aspect of the present invention, in an OFF state of the solenoid valve is a state wherein the solenoid valve is opened on an atmospheric pressure side. Therefore, the pressure switch can be diagnosed in traveling.

In the arrangement according to the sixth aspect of the present invention, the region in which outputting of a signal from the pressure switch is stopped is defined by an engine load, a diagnosis region of close-diagnosis of the atmospheric-pressure valve of the solenoid valve is performed can be easily determined.

BRIEF DESCRIPTION OF THE DRAWINGS

FIG. 4 is a flow chart showing a diagnosis process in FIG. 1; and

FIG. 5 is a timing chart according to the diagnosis process in FIG. 4.

DESCRIPTION OF THE PREFERRED EMBODIMENTS

An embodiment of the present invention will be described below with reference to FIGS. 1 to 5.

Figure 1:
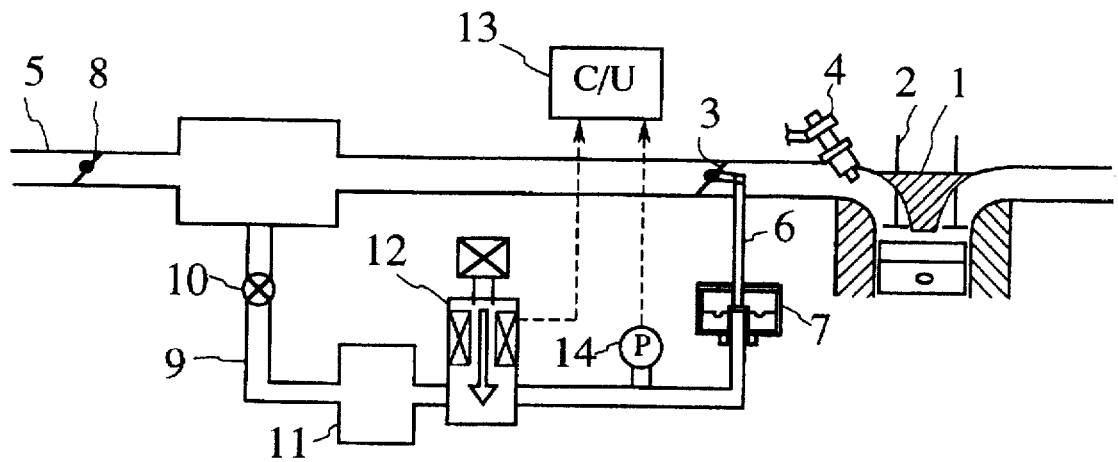
FIG. 1 is a view showing the structure of an embodiment of the present invention.

Referring to FIG. 1 showing this embodiment, a swirl control valve (to be referred to as "SCV" hereinafter) 3 is arranged near a intake valve 2 on an intake valve 5 of an engine 1, air is sucked through the SCV 3. A fuel injection valve 4 is arranged between the SCV 3 and the intake valve 2, thereby injection-supplying fuel.

Figure 2:
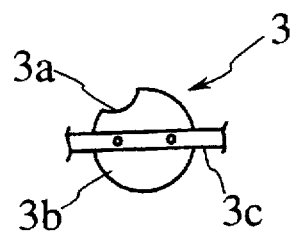
FIG. 2 is a view showing the arrangement a swirl control apparatus in FIG. 1.

The SCV 3 is constituted by a valve member 3b having a notch 3a shown in FIG. 2, and is arranged such that the section of the intake path 5 can be partially opened/closed. When the intake path 5 is closed, the SCV 3 throttles suction air and expands disturbance of suction air. A support shaft 3c is shared by all cylinders, and supports valve members 3b whose number is equal to the number of cylinders.

A diaphragm negative-pressure actuator 7 is connected to the support shaft 3c through an output rod 6.

An inlet port of a negative-pressure air supply pipe 9 is arranged on the downstream side of a throttle valve 8 of the intake path 5.

The negative-pressure air supply pipe 9 causes the downstream portion of the throttle valve 8 to communicate with the negative-pressure actuator 7, and selectively switches a negative pressure or an atmospheric pressure. The negative pressure is assumed by a one-way valve 10 and a negative-pressure tank 11 arranged in the negative-pressure air supply pipe 9, and atmospheric pressure air is supplied by a SCV solenoid valve (to be referred to as a "solenoid valve" hereinafter) 12 arranged in the negative-pressure air supply pipe 9.

Opening/closing control of the solenoid valve 12 is performed by a control unit (to be referred to as a "C/U" hereinafter) 13 in which a microcomputer is built. The solenoid valve 12 is arranged in such a manner that the solenoid is energized (solenoid on) to close the atmospheric-pressure valve and to open the valve on the negative-pressure tank 11 side, and energization of the solenoid is stopped (solenoid off) to close the valve on the negative-pressure tank 11 side and to open the atmospheric-pressure valve.

A pressure switch 14 for detecting a pressure in the pipe is arranged between the negative-pressure actuator 7 and the solenoid valve 12 in the negative-pressure air supply pipe 9.

Figure 3:
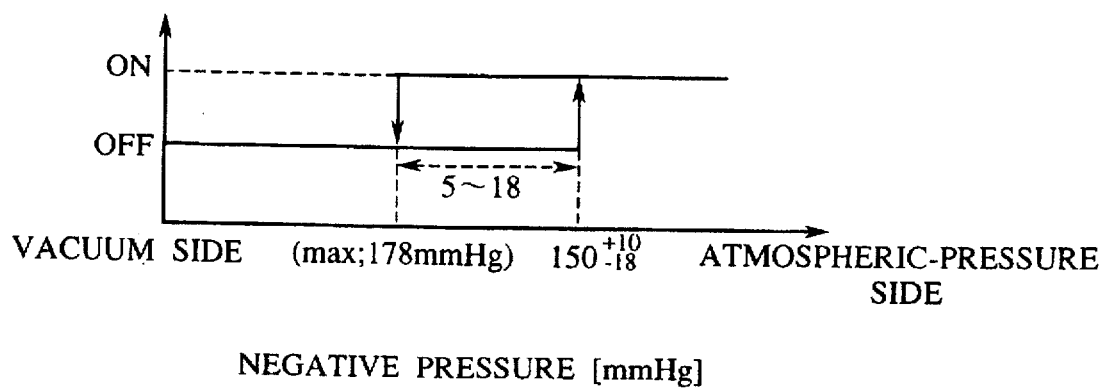
FIG. 3 is a graph showing the characteristics of a negative switch in FIG. 1.

As shown in FIG. 3, the pressure switch 14 is turned on (signal output) when the pressure in the pipe increases from the vacuum side to the atmospheric-pressure side (negative pressure decreases) and exceeds 150 mmHg, and is turned off (stop of signal output) when the pressure in the pipe decreases from the atmospheric-pressure side to the vacuum side (negative pressure increases) and exceeds a value smaller than 178 mmHg. In this pressure switch 14, for example, a frequency of occurrence of a failure in which a negative pressure cannot be detected because of ON-state fixture of the pressure switch 14 becomes low. An ON/OFF signal from the pressure switch 14 is input to the C/U 13.

States of the system of the SCV 3 are shown in Table 1.

TABLE 1

| SOLENOID VALVE | ON | OFF |
|---|---|---|
| NEGATIVE-PRESSURE ACTUATOR | NEGATIVE-PRESSURE | ATMOSPHERIC PRESSURE |
| SCV | CLOSED | OPEN |
| PRESSURE SWITCH | OFF | ON |
| C/U TERMINAL | NOT FALL IN GND | FALL IN GND |

In this case, according to the pressure switch 14 and a failure diagnostic FTA (Fault Tree Analysis: an analyzing method in which facts are chained in a top-down manner toward a lower-order reason from a fact which is not preferable for the system) for a swirl control apparatus, the following modes are available.

(1) failure occurring when the solenoid of the solenoid valve 12 is turned on (energized) and the pressure switch 14 is in an ON state (failure in which a detection result is an atmospheric pressure even if the solenoid valve 12 is controlled to make the pressure in the pipe negative)

(1-1) failure caused by removal of the connector of the solenoid valve 12, an open-state fixture (atmospheric-pressure valve is open, and negative-pressure valve is closed) of the valve, leakage of negative-pressure air from the negative-pressure air supply pipe 9 (e.g., removal of the pipe), or the like (1-2) failure caused by ON-state fixture of the pressure switch 14 (atmospheric pressure is always detected), a short circuit, or the like (2) failure occurring when the solenoid of the solenoid valve 12 is turned off (not energized), and the pressure switch 14 is in an OFF state (failure in which a detection result is a negative pressure even if the solenoid valve 12 is controlled to make the pressure in the pipe atmospheric)

(2-1) failure caused by a GND short circuit of the solenoid valve 12, closed-state fixture of the valve (atmospheric-pressure valve is closed, and the negative-pressure valve is opened), clogging of the pipe, or the like (2-2) failure caused by OFF-state fixture of the pressure switch 14 (negative pressure is always detected, removal of connector, disconnection of a harness, or the like According to actual results, in case of (1), as described above, a frequency of occurrence of the failure in (1-2) is lower than a frequency of occurrence of the failure in (1-1). In case of (2), a frequency of occurrence of the failure in (2-1) is lower than a frequency of occurrence of the failure in (2-2).

The C/U 13 opening/closing-controls the solenoid valve 12, and diagnoses an operation state of swirl control on the basis of an ON/OFF signal from the pressure switch 14.

A diagnostic process performed by the C/U 13 will be described below.

In rotation of the engine 1, diagnosis is performed on the basis of the flow chart in FIG. 4.

This diagnosis is performed such that the pressure switch 14 is reliably turned off, i.e., in a region in which a negative pressure can be assured.

As shown in FIG. 3, the region in which the pressure switch 14 is turned off has a negative pressure of 178 mmHg or more (after durability). The negative pressure of the diagnostic region is set to be 200 mmHg or more with a margin.

This diagnostic region is defined by a weighted mean value TPV of a basic fuel injection time Tp.

In this case, the weighted mean value TPV is calculated by equations (1) and (2):

$$Tp = K \times Q/N \quad (1)$$

where
K: constant
Q: flow rate of suction air
N: rotating speed of engine 1

$$TPV(n) = ((Tp + (2^5-1) \times TPV(n))/2^5 \quad (2)$$

For example, when the negative pressure is set to be 200 mmHg, the basic fuel injection time Tp is defined to be Tp<3.5 ms. However, erroneous diagnosis at a highland may occurs, Tp<2.0 ms is set in consideration of about 0.6 atm (4,500 m). An arrangement in which an atmospheric pressure sensor is arranged to decrease the basic fuel injection time Tp with a decrease in atmospheric pressure.

In step ("S" in FIG. 4, and to be referred to as "S" hereinafter) 1, a control state of the solenoid valve 12 is determined.

When the solenoid valve 12 is in an ON state, and the pressure switch 14 is in an OFF state, i.e., when a pressure which is on the vacuum side with reference to 0.6 atm is detected when the solenoid valve 12 is controlled to be closed (vacuum side), it is determined that the solenoid valve 12 and the pressure switch 14 are normal (steps 1→2→3).

When the solenoid valve 12 is in an OFF state, and the pressure switch 14 is in an ON state, i.e., when a pressure which is on the atmospheric-pressure side with reference to 0.6 atm is detected when the solenoid valve 12 is controlled to be open (atmospheric-pressure side), it is determined that the solenoid valve 12 and the pressure switch 14 are normal (steps 1→5→6).

When the solenoid valve 12 is controlled to be closed, and the pressure switch 14 is set in an ON state, it is determined that abnormality occurs in the solenoid valve 12 (steps 1→2→4).

More specifically, in this case, the pressure in the negative-pressure air supply pipe 9 is an atmospheric pressure by removal of the connector of the solenoid valve 12, open-state fixture of the valve, or the like (failure in (1-1)), or the pressure in the negative-pressure air supply pipe 9 is a negative pressure. However, an atmospheric pressure may be detected (failure in (1-2)) because of ON-state fixture of the pressure switch 14, a GND short circuit, or the like. As described above, a frequency of occurrence of the failure in (1-2) is lower than that of the failure in (1-1). In this case, it is determined that the solenoid valve 12 or the like is abnormal.

When it is determined that the solenoid valve 12 or the like has a failure, the pressure switch 14 may have a failure. This is described in, e.g., a service manual or the like. Not only the solenoid valve 12 or the like, but also the pressure switch 14 are checked in service to specify an abnormal position.

Although the solenoid valve 12 is controlled to be opened, when the pressure switch 14 is in an OFF state, the C/U 13 waits until a predetermined time has elapsed. This is because the negative-pressure tank 11 is arranged in the negative-pressure air supply pipe 9. That is, as shown in FIG. 5, a long time is required to completely exhaust negative-pressure air after the solenoid valve 12 is controlled to be opened, and the pressure in the pipe is not necessarily set to be the atmospheric pressure. Therefore, if the C/U 13 is instantaneously turned on, it is determined that the pressure switch 14 is normal.

Even if the predetermined time has elapsed, when the pressure switch 14 is in an OFF state, it is determined that the pressure switch 14 is abnormal (steps 7→8).

More specifically, the pressure in the negative-pressure air supply pipe 9 may be set to be a negative pressure by the GND short circuit of the solenoid valve 12, open-state fixture of the valve, clogging of the pipe, or the like (failure in (2-1), or although the pressure in the negative-pressure air supply pipe 9 is the atmospheric pressure, the negative pressure may be detected (failure in (2-2)) because of OFF-state fixture of the pressure switch 14, disconnection, or the like. Since the frequency of occurrence of the failure in (2-2) is higher than the frequency of occurrence of the failure in (2-1), it is determined that the pressure switch 14 is abnormal.

The diagnosis for the pressure switch 14 performed at this time is a diagnostic logic used in only a failure mode such as removal of the connector of the pressure switch 14 or disconnection of a harness which frequently occurs.

In order to improve reliability of failure diagnosis, diagnosis for only the pressure switch 14 is performed. Since this diagnosis must be performed independently of diagnosis of an operation state of swirl control, the diagnosis is performed when in a non-rotation state of the engine 1.

In the non-rotation state of the engine, the pressure in the pipe is set to be an atmospheric pressure. For this reason, when the pressure switch 14 is an ON state at this time, it is determined that the pressure switch 14 is normal.

In the non-rotation state of the engine 1, a negative pressure is generated, and the pressure in the pipe is set to be an atmospheric pressure. For this reason, when the pressure switch 14 is turned on at this time, it is determined that the pressure switch 14 is normal. If it is not determined that the pressure switch 14 is normal, it is understood that the pressure switch 14 is kept OFF from a key ON operation to this time, disconnection or OFF-state fixture may occurs, and it is determined the pressure switch 14 is abnormal.

The diagnosis for the pressure switch 14 can performed only when the pressure in the negative-pressure air supply pipe 9 is an atmospheric pressure, i.e., the solenoid valve 12 is in an OFF state. For this reason, there is almost no opportunity to perform the diagnosis in normal traveling (especially, FTP traveling). Therefore, when there is no opportunity to diagnose the pressure switch 14, a self-shut off waiting time after a key-OFF operation may be elongated to assure the opportunity.

In this case, steps 3 and 4, steps 6 to 8 in FIG. 4, and the diagnostic process in the non-rotation state of the engine 1 correspond to a diagnostic means.

According to the above arrangement, since failure diagnosis is performed by a combination between the ON/OFF state of the solenoid valve 12 and the ON/OFF state of the pressure switch 14, the operation state of not only the solenoid valve 12 or the like, but also the operation state of the pressure switch 14 can be diagnosed.

What is claimed is:

1. A failure diagnostic apparatus for a swirl control apparatus comprising:

a swirl control valve, arranged in an intake path extending to an intake valve of an internal combustion engine, for expanding suction air disturbance in a closed state;

a negative-pressure actuator for opening/closing said swirl control valve;

a solenoid valve, arranged in a pipe extending to a negative-pressure operation chamber of said negative-pressure actuator, for selectively supplying negative-pressure or atmospheric-pressure air into the pipe by energizing control of said negative-pressure actuator;

a pressure switch for detecting a pressure in a pipe between said solenoid valve and said negative-pressure actuator; and diagnostic means for diagnosing an operation state of swirl control on the basis of the energizing control of said solenoid valve and a detection result of the pressure in the pipe obtained by said pressure switch, wherein said diagnostic means is arranged in such a manner that, when a combination between the energizing control of said solenoid valve and the detection result from said pressure switch is abnormal, said diagnostic means determines, depending on the combination, whether said pressure switch is normal or abnormal.

2. A failure diagnostic apparatus for a swirl control apparatus according to claim 1, wherein said diagnostic means is arranged in such a manner that said diagnostic means performs diagnosis a predetermined time after said solenoid valve is switched.

3. A failure diagnostic apparatus for a swirl control apparatus according to claim 1, wherein said diagnostic means determines whether said negative switch is normal or abnormal based on combinations of ON and OFF states for said energizing control of said solenoid valve and of output signals of said pressure switch indicative of pressure in the pipe.

4. A failure diagnostic apparatus for a swirl control apparatus comprising:

a swirl control valve, arranged in an intake path extending to an intake valve of an internal combustion engine, for expanding suction air disturbance in a closed state;

a negative-pressure actuator for opening/closing said swirl control valve;

a solenoid valve, arranged in a pipe extending to a negative-pressure operation chamber of said negative-pressure actuator, for selectively supplying negative-pressure or atmospheric-pressure air into the pipe by energizing control of said negative-pressure actuator;

a pressure switch for detecting a pressure in a pipe between said solenoid valve and said negative-pressure actuator; and diagnostic means for diagnosing an operation state of swirl control on the basis of the energizing control of said solenoid valve and a detection result of the pressure in the pipe obtained by said pressure switch, wherein said diagnostic means is arranged in such a manner that, when a combination between the energizing control of said solenoid valve and the detection result from said pressure switch is abnormal, said diagnostic means determines, depending on the combination, whether said negative switch is normal or abnormal, wherein said solenoid valve closes an atmospheric-pressure side valve by energizing said solenoid valve, said pressure switch has a pole such that said pressure switch outputs a signal when the pressure in the pipe is on an atmospheric pressure side with reference to a predetermined pressure, and stops outputting of the signal when the pressure in the pipe is on a negative pressure side.

5. A failure diagnostic apparatus for a swirl control apparatus according to claim 4, wherein said diagnostic means is arranged in such a manner that said diagnostic means determines that said pressure switch is normal when a signal is output from said pressure switch when the internal combustion engine is not rotated to generate no negative pressure, and determines that said pressure switch is abnormal when said pressure switch outputs no signal.

6. A failure diagnostic apparatus for a swirl control apparatus according to claim 4, wherein said diagnostic means is arranged in such a manner said diagnosis means diagnoses said pressure switch in an OFF state of said solenoid valve.

7. A failure diagnostic apparatus for a swirl control apparatus comprising:

a swirl control valve, arranged in an intake path extending to an intake valve of an internal combustion engine, for expanding suction air disturbance in a closed state;

a negative-pressure actuator for opening/closing said swirl control valve;

a solenoid valve, arranged in a pipe extending to a negative-pressure operation chamber of said negative-pressure actuator, for selectively supplying negative-pressure or atmospheric-pressure air into the pipe by energizing control of said negative-pressure actuator;

a pressure switch for detecting a pressure in a pipe between said solenoid valve and said negative-pressure actuator; and diagnostic means for diagnosing an operation state of swirl control on the basis of the energizing control of said solenoid valve and a detection result of the pressure in the pipe obtained by said pressure switch, wherein said diagnostic means is arranged in such a manner that, when a combination between the energizing control of said solenoid valve and the detection result from said pressure switch is abnormal, said diagnostic means determines, depending on the combination, whether said negative switch is normal or abnormal, wherein said diagnostic means is arranged in such a manner that said diagnostic means performs diagnosis a predetermined time after said solenoid valve is energized, and wherein said diagnostic means is arranged in such a manner that a region in which outputting of a signal from said pressure switch is stopped is defined by an engine load, and close-diagnosis of an atmospheric-pressure valve of said solenoid valve is performed in the region.

* * * * *